United States Patent
Quick, Jr. et al.

(10) Patent No.: US 8,463,250 B2
(45) Date of Patent: *Jun. 11, 2013

(54) RELIABLE RECEPTION OF BROADCAST/MULTICAST CONTENT

(75) Inventors: Roy Franklin Quick, Jr., San Diego, CA (US); Raymond T. Hsu, San Diego, CA (US); Michael-David Nakayoshi Canoy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/504,236

(22) Filed: Aug. 14, 2006

(65) Prior Publication Data

US 2006/0276183 A1 Dec. 7, 2006

Related U.S. Application Data

(63) Continuation of application No. 10/439,594, filed on May 16, 2003, now Pat. No. 7,113,773.

(51) Int. Cl.
*H04M 3/42* (2006.01)

(52) U.S. Cl.
USPC ............... 455/414.3; 455/414.4; 455/403; 370/349

(58) Field of Classification Search
None
See application file for complete search history.

(56) References Cited

U.S. PATENT DOCUMENTS

| | | | |
|---|---|---|---|
| 5,978,381 A | 11/1999 | Perlman et al. | |
| 6,724,746 B1 * | 4/2004 | Linden | 370/349 |
| 6,810,070 B1 | 10/2004 | Sourour | |
| 7,061,896 B2 | 6/2006 | Jabbari et al. | |
| 7,113,773 B2 | 9/2006 | Quick, Jr. et al. | |
| 7,266,130 B2 | 9/2007 | Lee et al. | |
| 2002/0032024 A1 | 3/2002 | Namba et al. | |
| 2002/0095636 A1 | 7/2002 | Tatsumi et al. | |
| 2002/0196760 A1 | 12/2002 | Malomsoky et al. | |

(Continued)

FOREIGN PATENT DOCUMENTS

| CN | 1394411 A | 1/2003 |
|---|---|---|
| EP | 1166507 A1 | 1/2002 |

(Continued)

OTHER PUBLICATIONS

International Search Report—PCT/US04/015207, International Search Authority—European Patent Office—Nov. 17, 2004.

(Continued)

*Primary Examiner* — Phuoc Doan
(74) *Attorney, Agent, or Firm* — Won Tae Kim

(57) ABSTRACT

Systems and methods for systems and methods for reliably broadcasting content to a plurality of users and facilitating distribution of portions of the broadcast content that either were not received by particular users, or were received with errors. In one embodiment, a wireless communication system is configured to broadcast content from a content source to a plurality of user devices. The content source is configured to provide the content to a base station. The base station parses the content into a plurality of segments and associates sequential identifiers with each of the segments. The content is then broadcast to each of the user devices. An identifier of an alternative data source is also provided to the user devices. When a mobile station receives the segments, it examines the segment identifiers to identify missing segments. The segments are then retrieved from the alternative data source identified by the base station.

85 Claims, 5 Drawing Sheets

U.S. PATENT DOCUMENTS

| | | | |
|---|---|---|---|
| 2003/0026240 A1* | 2/2003 | Eyuboglu et al. | 370/349 |
| 2003/0125035 A1 | 7/2003 | Khafizov et al. | |
| 2003/0142726 A1 | 7/2003 | Eltawil et al. | |
| 2004/0205071 A1 | 10/2004 | Uesugi et al. | |
| 2009/0268567 A1* | 10/2009 | Marko et al. | 369/7 |

FOREIGN PATENT DOCUMENTS

| | | |
|---|---|---|
| EP | 1235383 | 8/2002 |
| JP | 2001053699 A | 2/2001 |
| JP | 2001274746 A | 10/2001 |
| JP | 2002077856 A | 3/2002 |
| JP | 2002237813 A | 8/2002 |
| JP | 2003051796 | 2/2003 |
| JP | 2003134064 A | 5/2003 |
| WO | 9966747 | 12/1999 |
| WO | WO0056022 | 9/2000 |

OTHER PUBLICATIONS

Written Opinion—PCT/US04/015207, International Search Authority—European Patent Office—Nov. 17, 2004.

European Patent—EP08156383—Eurpoean Search Authority—Munich—Aug. 6, 2008.

Taiwanese Search report—093113586—TIPO—Jul. 15, 2010.

* cited by examiner

RELIABLE RECEPTION OF BROADCAST/MULTICAST CONTENT

CLAIM OF PRIORITY UNDER 35 U.S.C. §120

The present Application for Patent is a Continuation and claims priority to patent application Ser. No. 10/439,594 entitled "RELIABLE RECEPTION OF BROADCAST/MULTICAST CONTENT" filed May 16, 2003, now U.S. Pat. No. 7,113,773, and assigned to the assignee hereof and hereby expressly incorporated by reference herein.

BACKGROUND

1. Field

The present invention relates generally to broadcast communications and more particularly to systems and methods for providing improved reliability in broadcast and/or multicast communications.

2. Related Art

Wireless communications are widely used for a vast array of applications. For example, wireless communications systems are used to provide mobile telephone access, paging capabilities and satellite communications. One of the most familiar applications of wireless technologies is in cellular telephone systems. As used herein, the term "cellular" is used to refer generically to wireless telephone systems, including cellular, PCS, and any other systems.

Cellular telephone systems have expanded from simply carrying voice communications to carrying voice and data, to providing high-speed data transfers for applications such as internet access. Various wireless interfaces have been developed for such cellular telephone systems including frequency division multiple access (FDMA), time division multiple access (TDMA), and code division multiple access (CDMA).

Assorted standards have also been developed for wireless communications, including Advanced Mobile Phone Service (AMPS), Global System for Mobile (GSM), and Interim Standard 95 (IS-95). IS-95 and its derivatives, such as IS-95A, IS-95B (often referred to collectively as IS-95), ANSI J-STD-008, IS-99, IS-2000, IS-657, IS-707, and others, are promulgated by the Telecommunication Industry Association (TIA) and other well known standards bodies.

Information which is transmitted using wireless communications systems is typically formatted into discrete groupings of data, each of which can be transmitted over a short period of time. These groupings of data may be referred to by various terms, including data packets, data frames, or simply packets or frames. When data (e.g., a data stream) is to be transmitted, it is broken down into pieces that are formatted into frames. The frames are typically transmitted individually over a wireless communication channel, checked to ensure that the frames have been accurately transmitted, and reassembled to form the original data stream.

Various techniques have been developed to allow receiving devices to verify the integrity of transmitted frames (i.e., to determine whether any errors occurred in the transmission of the frames). For example, each packet may contain a check value such as a CRC (cyclic redundancy check) value. The check value is computed based on the contents of the frame and is inserted into the frame prior to transmission. The check value of the received frame is then checked against the frame contents to determine whether the value accurately corresponds to the contents. If so, then the frame is determined to be free of errors.

While the use of check values can be used to ensure data integrity, it does not address the problem of frames that are dropped during transmission (as opposed to being received with errors). If a frame is not received, the check value clearly cannot be used to identify the error (the fact that the frame was dropped). Other mechanisms have therefore been developed to identify frames that are missing from the received data. One such mechanism is the radio link protocol (RLP).

RLP is used to control frame re-transmissions when one or more frames are not successfully received (i.e., that are dropped or that contain errors). RLP determines how and when the frames are re-transmitted. One of the primary features of RLP is the inclusion of a sequence number in the header of each frame that is transmitted. Because each frame has a sequence number, the receiving device knows that the received frames should contain a continuous series of sequence numbers. If a sequence number is missing, then the corresponding frame is missing. Consequently, if the receiving device detects a missing sequence number, it transmits a request to the transmitting device to re-send the frame with the missing sequence number. The receiving device may request re-transmission a number of times. If the frame is still not successfully received, the receiving device may ignore the missing frame.

RLP was developed to address the problem of missing frames in point-to-point transmissions of data. This type of re-transmission scheme is impractical in a broadcast communication system, however, because there is a potentially large number of receiving devices that may request re-transmission of frames that are missing or that contain errors. Even if there were relatively few re-transmission requests, the overall performance of a broadcast system would suffer if a broadcast had to be interrupted to service the re-transmission requests of a small number of receivers. It would therefore be desirable to provide a mechanism for servicing these requests without degrading the performance of the broadcast system.

SUMMARY OF THE INVENTION

One or more of the problems outlined above may be solved by the various embodiments of the invention. Broadly speaking, the invention comprises systems and methods for reliably broadcasting content to a plurality of users and facilitating distribution of portions of the broadcast content that were not received by particular users, or which were received with errors.

In one embodiment, a wireless communication system is configured to broadcast content from a content source to a plurality of user devices. The content source is configured to provide the content in a plurality of segments and to provide sequential identifiers associated with each of the segments. The content is then transmitted to each of the user devices via a broadcast channel of the wireless communication system. In addition to the broadcast content, the system also transmits to the user devices an identifier of a data source from which missing segments of the broadcast data can be retrieved. When the segments are received by the user devices, they are examined to determine whether all of the sequential segment identifiers were received (i.e., whether there are gaps in the sequence of identifiers). If any segments are missing, the respective user device retrieves the missing segment(s) from the data source identified by the system. Segments that are identified as containing errors can be retrieved in the same manner.

An alternative embodiment of the invention may comprise a method implemented on the transmitting side of a broadcast link (e.g., in a broadcast station). In this embodiment, the method comprises formatting broadcast content into multiple segments, associating sequential segment identifiers with each of the segments, broadcasting the segments and associated segment identifiers to multiple receivers, and providing to the receivers an identifier of a source from which the receivers can retrieve segments of the broadcast that are not successfully received.

Another alternative embodiment of the invention may comprise a method implemented on the receiving side of a broadcast link (e.g., in a mobile station). In this embodiment, the method comprises receiving segments of broadcast content wherein each segment has an associated sequential segment identifier, receiving an identifier of a data source from which segments that are not successfully received can be retrieved, examining the segment identifiers associated with the received segments, determining whether any of the segments were not successfully received, and retrieving from the identified data source any segments that were not successfully received.

Yet another alternative embodiment comprises a transceiver system that is configured to perform one of the methods described above. The transceiver system serves as either a base station or a mobile station, as appropriate for the corresponding method. The system includes a transceiver subsystem for receiving and transmitting data, and a processor for processing the data and controlling the operation of the transceiver subsystem in accordance with the corresponding method. It should be noted that the operation of the transceiver system is controlled in large part by the programming of the processor. The software, firmware or other type of program instructions that are executed by the processor to control the operation of the transceiver system are therefore also considered to comprise alternative embodiments of the invention.

Numerous additional embodiments are also possible.

BRIEF DESCRIPTION OF THE DRAWINGS

Various aspects and features of the invention are disclosed by the following detailed description and the references to the accompanying drawings, wherein.

Figure 1:
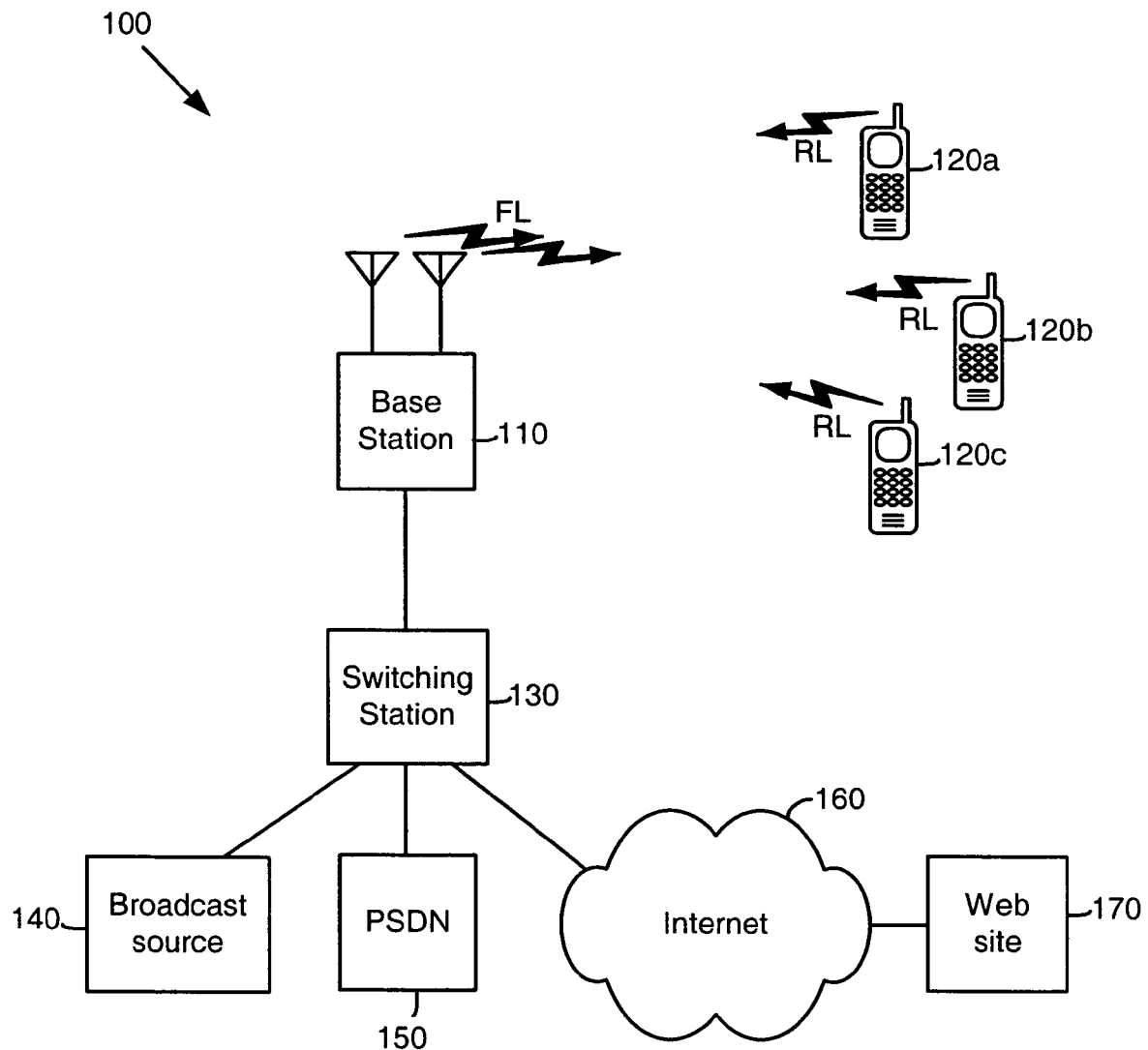
FIG. 1 is a diagram illustrating the structure of an exemplary wireless communications system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION OF A PREFERRED EMBODIMENT

One or more embodiments of the invention are described below. It should be noted that these and any other embodiments described below are exemplary and are intended to be illustrative of the invention rather than limiting.

As described herein, various embodiments of the invention comprise systems and methods for reliably broadcasting content to a plurality of users and facilitating distribution of portions of the broadcast content that were not received by particular users, or which were received with errors.

In one embodiment, a wireless communication system is configured to broadcast content from a content source to a plurality of user devices. The content source is configured to provide the content in a plurality of segments and to provide sequential identifiers associated with each of the segments. The content is then transmitted to each of the user devices via a broadcast channel of the wireless communication system.

Because the quality of transmissions on the broadcast channel is subject to atmospheric conditions, fading characteristics of the user devices and the like, errors may occur in the transmission of the broadcast content. Consequently, some of the segments may not be received by one or more of the user devices, or the received segments may contain errors. The particular segments which are missing, or which contain errors, may vary from one user device to another. The system therefore provides to each of the users an identifier of a web site or other source from which segments can be retrieved to replace those that were missing from the broadcast, or which were received with errors. Each user can individually request particular segments of the broadcast content from the identified source without requiring that these segments be re-broadcast to all of the users.

Thus, one embodiment of the invention comprises a method implemented in this system, wherein the base station receives broadcast content from a data source, breaks the content down into segments, associates sequence identifiers with the segments, and transmits the segments to one or more mobile stations along with an identifier of a source from which unsuccessfully received segments can be requested. The mobile stations are configured to receive the segments, examine the sequence identifiers associated with the segments, identify unsuccessfully received segments, and request these segments from the source identified by the broadcast station.

The various embodiments of the invention may provide a number of advantages over the prior art. For example, in some embodiments, because segments of the broadcast data which are missing or which contain errors are retrieved from a data source separate from the broadcast content source, the broadcast content source does not need to have the capability of retrieving individual segments and transmitting them to users in response to requests for this data. The performance of the broadcast content source may therefore be improved. It may also be advantageous to be able to download particular small segments of the broadcast data rather than having to retransmit large portions or even the entirety of the data. Further, it may be advantageous to be able to deliver requested segments of the broadcast content to individual users, rather than re-broadcasting the requested content to all recipients of the original broadcast. Still further advantages will be apparent to those skills in the art of the invention upon reading the present disclosure.

A preferred embodiment of the invention is implemented in a wireless communication system such as a cdma2000 system. Referring to FIG. 1, a diagram illustrating the structure of an exemplary wireless communications system is shown.

As depicted in FIG. 1, system 100 comprises a base station 110 that is configured to communicate with a plurality of mobile stations 120. Mobile stations 120 may, for example, be cellular telephones, personal information managers (PIMs or PDA), or the like that are configured for wireless communication. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120*a*, 120*b*, and so on. The items may be collectively referred to herein simply by the reference numeral.

Base station 110 is also coupled to a switching station 130 via a wireline link. The link to switching station 130 allows base station 110 to communicate with various other system components, such as a broadcast server 140, a packet switched data network 150, or a web site 170 via the Internet 160. It should be noted that the mobile stations and system components in this figure are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
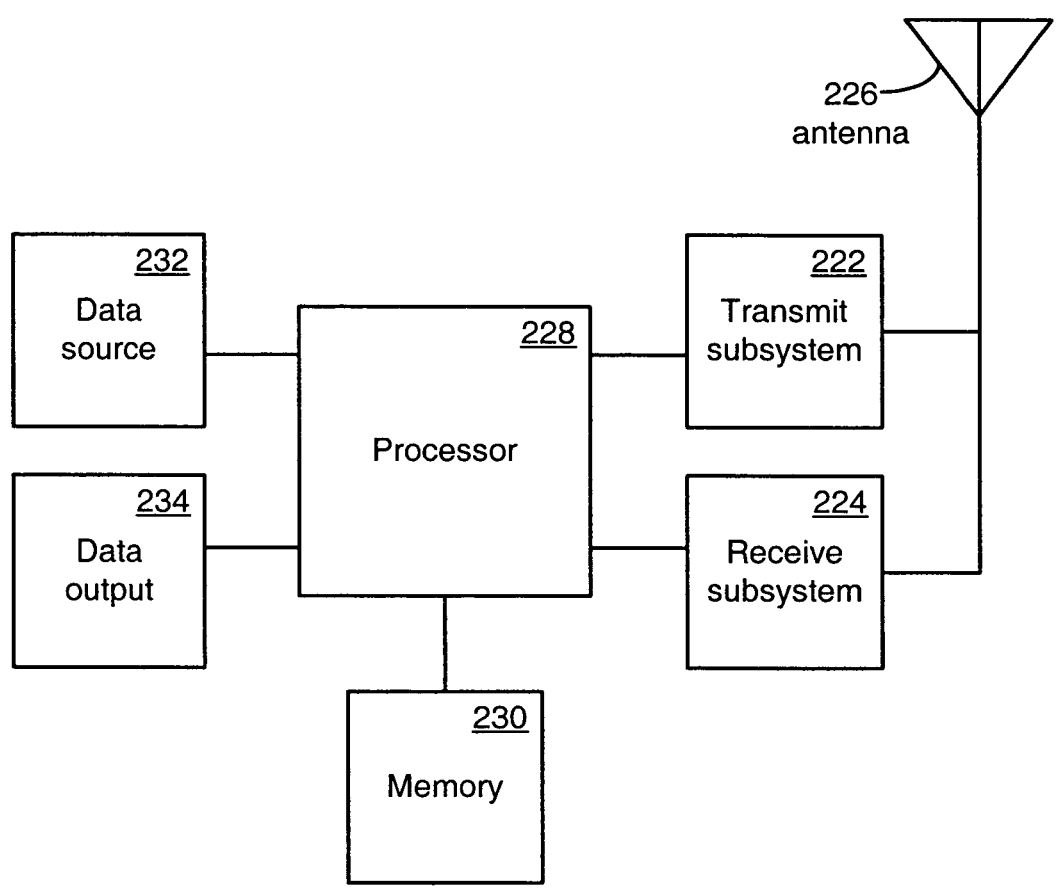
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 May, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

As mentioned above, the communication link between the base station and the mobile station can be broken down into various channels. These channels include both traffic channels, over which data is transmitted, and control channels, over which control signals are transmitted. Each of the traffic channels generally has one or more control channels associated with it.

The communications between the various components of system 100 may comprise transmissions of various different types of data. For instance, system 100 may support voice communications, voice/data communications, or high-speed data communications. Further, the communications may comprise point-to-point transmissions between particular components of the system, or they may comprise multicast or broadcast transmissions from one component to a plurality of components. Generally speaking, broadcast communications are directed from a source component to all destination components in the system, while multicast communications are directed from a source component to a subset of the possible destination components. It should be noted, however, that for the purposes of this disclosure, the term "broadcast" will be used to refer to both broadcast and multicast communications.

As indicated above, in one embodiment, system 100 comprises a cdma2000 system. In this embodiment, system 100 provides various types of communication capabilities between base station 110 and mobile stations 120. For example, system 100 may provide point-to-point high-speed communications via a Forward Supplemental Channel (F-SCH). This channel is defined between base station 110 and an individual mobile station 120 using data rates up to 307 kbs. Low-speed data may be communicated through the F-SCH, through a Forward Fundamental Channel (F-FCH) or through a Forward Dedicated Control Channel (F-DCCH) which is assigned to a particular mobile station.

In addition to point-to-point communications, each mobile station can receive broadcast communications. Messages intended for multiple recipients may, for example, be transmitted over a forward broadcast control channel (F-BCCH). This channel is a logical communication channel between base station 110 and mobile stations 120. The messages broadcast over the F-BCCH are generally low-speed data, typically comprising text messages. There are a number of methods for communicating a broadcast message over the F-BCCH. These methods typically involve the mobile station monitoring a predefined frequency, time slot, and/or code (e.g., a Walsh code in CDMA systems) for a page message indicating that a broadcast message directed to the mobile station is available. Instructions for receiving the broadcast message may be transmitted to the mobile station via the forward common control channel (F-CCCH), which is received by each mobile station in system 100.

Communication system 100 also has a Forward High-Speed Broadcast Channel (F-HSBCH). This channel can be used to transmit high-speed data, such as Internet Protocol (IP) datagrams. Thus, mobile stations 120 can receive broadcast communications such as streaming audio and video information or large computer files via the F-HSBCH.

In one embodiment, high-speed data is transmitted from one or more base stations to multiple mobile stations using the F-HSBCH. Each mobile station may also monitor one or more paging or control channels to receive signaling and instructions from a base station in order to receive point-to-point voice calls, receive high-speed data on a different frequency/time slot/code, receive SMS or other low speed group messages, and so on. For example, a mobile station may monitor a forward paging channel (F-PCH), F-BCCH or F-CCCH for such information. In another embodiment, this information is received by monitoring a F-DCCH, which is a signaling channel used to transmit information to mobile stations on an individual basis.

The mobile stations may transmit data back to the base station over a number of reverse link channels. For example, in a cdma2000A-compliant system, data may be transmitted over a reverse access channel (R-ACH), an extended reverse access channel (R-EACH), a reverse dedicated control channel (R-DCCH), or a reverse common control channel (R-CCCH).

As noted above, data may be broadcast to multiple mobile stations at the same time. Broadcasts of data may be useful in a number of situations. For instance, if it is necessary to distribute program code comprising a software update to a group of mobile stations, it may be convenient to broadcast the software to all of the mobile stations at once. It may also be desirable to provide news or entertainment services (e.g., streams of audio and/or video data) to multiple mobile stations. This data may be viewed in real-time (or near-real-time), or it may be stored for later use by the users of the mobile stations.

As also indicated above, one of the problems with broadcasting data to a group of users (e.g., mobile stations) is that there may be errors in the transmission of the broadcast data. The users may therefore successfully receive a portion of the broadcast data, but some portion of the received data may contain errors. Alternatively, some of the data may not be received at all.

In some situations, not receiving some of the data, or receiving data that contains errors, is not critical. For example, if the broadcast comprises current news headlines or weather information that is periodically repeated, missing or incorrectly received data may cause minor viewing/listening errors, but the information will be repeated, so it is likely that the data will be correctly transmitted when the transmission is repeated. Alternatively, the broadcast may comprise streaming video or audio, in which a few missing frames of data will not cause a significant problem. On the other hand, there may be situations in which errors or missing portions of the data simply cannot be tolerated. For example, if the broadcast data comprises a software update that is being transmitted to multiple users, it is necessary for each user to successfully receive all of the data. If any portion of the software update is missing, the software will not function correctly. In these situations, it is necessary to provide some means for obtaining the data that was not successfully received.

Figure 3:
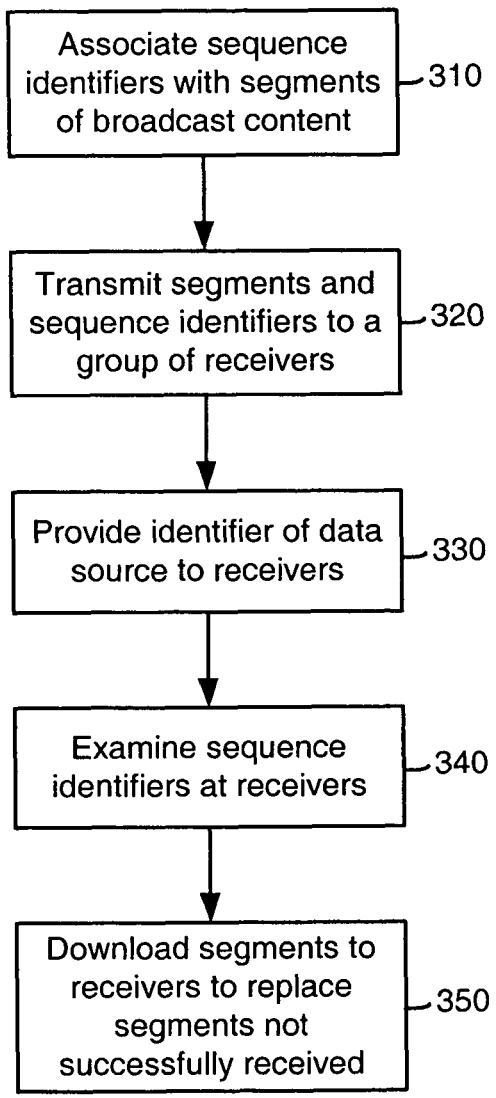
FIG. 3 is a flow diagram illustrating a method in accordance with an exemplary embodiment of the invention.

Embodiments of the present invention are directed to resolving such problems. Referring to FIG. 3, a flow diagram illustrating a method in accordance with an exemplary embodiment of the invention shown. In this embodiment, the method comprises associating sequence identifiers with segments of broadcast content (310), transmitting the segments and associated sequence identifiers to a group of receivers (320), providing to the receivers an identifier of a data source from which the segments of the broadcast content can be individually retrieved (330), examining the sequence identifiers of the broadcast content at the receivers to identify missing segments (340), and individually retrieving segments of the broadcast content to particular receivers to replace segments that were not successfully received (350). It should be noted that "retrieving" is used herein to refer to the process of obtaining the segments from the data source, which may simply comprise requesting the segments from the data source and waiting for them to be delivered.

It may be useful to refer again to FIG. 1 in relation to this method. In the system of FIG. 1, base station 110 is coupled to broadcast source 140 through switching station 130. Broadcast source 140 provides broadcast content to base station 110. This content is received by base station 110 and formatted for transmission to mobile stations 120. In this embodiment, the process of formatting includes parsing the broadcast content into segments, each of which will be contained in a frame transmitted by base station 110 to mobile stations 120. Each frame contains an identifier of that frame's position in the sequence of frames that are being broadcast. The identifier may, for example, comprise a simple sequence number. In this instance, the first frame which contains a segment of the broadcast content may have sequence number 1, while the next frame has sequence number 2, and so on. Other types of sequence identifiers, such as timestamps, may be used in other embodiments.

Base station 110 transmits the frames (containing the segments) to mobile stations 120 over a forward link broadcast channel. Each of mobile stations 120 receives the frames from base station 110 and examines the frames to determine their respective sequence numbers. If any number in the sequence is missing, the mobile station identifies the missing sequence number. For example, if the frames received by a particular mobile station have sequence numbers 1, 2, 3, 5, 6 . . . , the mobile station identifies missing sequence number 4. It should be noted that the mobile stations in this embodiment are also configured to identify any of the received frames which contain errors.

When a mobile station 120 identifies a frame that is missing from the received frames, or that contains errors, the mobile station individually requests this frame from the alternative data source specified in connection with the broadcast. For example, if website 170 is identified as the alternative source from which missing or errored frames can be retrieved, the mobile station 120 transmits a request for then needed frame over a reverse link to base station 110, which forwards the request through switching station 130 and Internet 160 to website 170. Responsive to the request, website 170 would transmit the needed frame through Internet 160 and switching station 130 to base station 110, which would then transmit the frame to the mobile station 120 over one of the forward link channels. It should be noted that a channel other than the broadcast channel would be used in this embodiment.

The identification of the data source from which the mobile stations can retrieve missing segments of the broadcast data (the alternative data source) may be provided to the mobile stations in a variety of ways. For example, in a pay-per-view type of scenario, each mobile station signs up to receive a broadcast. At this time, the mobile station may receive an encryption key that is necessary to decode the broadcast data. In the same manner, the mobile station may obtain the identifier of the alternative data source. In another embodiment, the base station may transmit the identifier of the alternative data source as part of the broadcast. In other words, it may be transmitted within a setup message or some other configuration information that is transmitted to the mobile stations at the beginning of the broadcast. Alternatively, the identifier may be transmitted to the mobile stations on a separate forward channel (e.g., a control channel). This transmission could take place at the beginning of the broadcast, periodically throughout the broadcast, or even at the end of the broadcast, although this would cause the mobile stations to have to wait until the end of the broadcast to retrieve missing segments of the broadcast data. The identifier could alternatively be included in the overhead data of one or more of the frames that contain the segments.

The form of the alternative data source identifier which is used may vary from one embodiment to another. For instance, in one embodiment, the identifier may comprise the address of a web site corresponding to the data source. In another embodiment, the alternative data source identifier may comprise an IP address. Still other forms may also be possible. While the form of the identifier may be limited by the constraints of a particular implementation, the form is not limited for the purposes of the invention itself.

The retrieval of the missing segments of the broadcast may be performed in a number of ways. For example, in one embodiment, the mobile station is configured to automatically initiate the retrieval of a segment of the broadcast data upon determining that the segment is missing (or that the segment contains errors). This may be preferable when the broadcast content comprises a software update. In this situation, each segment is critical, as the software will not function properly in the absence of a portion of the software code (i.e., the missing segment). It is therefore assumed that the user would want to proceed with the retrieval of the needed segments. In other situations, such as the broadcast of audio or video, it may not be critical to have all of the segments of the broadcast data, and the retrieval of missing segments may be presented to the user of the mobile station as an option. In other words, the user may be prompted to decide whether or not to initiate the retrieval of the unsuccessfully received segments. The user may then manually initiate the retrieval of the missing segments in response to the prompt.

In addition to the various embodiments of the invention which are described above, numerous alternative embodiments will be apparent to those of skill in the art of the invention. These embodiments may include one or more of the alternative features that are described below. These features are exemplary of the alternative embodiments, and not limiting.

In one embodiment, the alternative data source comprises a data server which is completely separate from the broadcast server. This configuration may be necessary when the broadcast content source is a sequential access device (e.g., a tape drive). This configuration may be preferable in other situations as well, since the use of a separate server relieves the broadcast content source from having to service the individual segment requests as well as providing the original broadcast content. There may be instances, however, in which it is acceptable or even preferable to utilize the same source to both provide the original content for broadcast to all of the mobile stations and also serve replacement segments to the individual mobile stations. It should be noted that, if the alternative data source is separate from the broadcast server, it may be necessary or desirable to provide the segments of the broadcast content (and the accompanying sequential identifiers) to the alternative data source prior to or at the time of the broadcast.

In the embodiments described above, the broadcast content is provided to the base station by a content source (e.g., source 140 in FIG. 1). It is contemplated that, in a preferred embodiment, the source of the content segments the data and inserts sequential segment identifiers into the segments to enable identification of missing segments. It should be noted, however, that the distribution of the tasks relating to segmenting the data and inserting sequential identifiers may be different in other embodiments. For instance, in some embodiments, the base station itself may perform one or more of these functions. The functions of other system components may be similarly redistributed in alternative embodiments of the invention.

Figure 4:
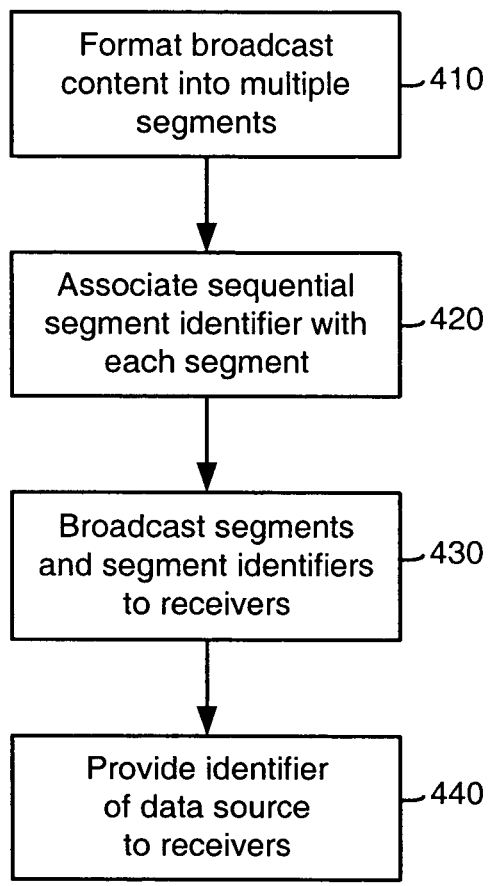
FIG. 4 is a flow diagram illustrating a method in accordance with an alternative embodiment of the invention.

The method described above encompasses actions on both the transmitting and receiving sides of the broadcast system. An alternative embodiment of the invention may comprise a method implemented on the transmitting side of the broadcast link (e.g., in the broadcast station). In this embodiment, which is illustrated by the flow diagram of FIG. 4, the method comprises formatting broadcast content into multiple segments (410), associating sequential segment identifiers with each of the segments (420), broadcasting the segments and associated segment identifiers to multiple receivers (430), and providing to the receivers an identifier of a source from which the receivers can retrieve segments of the broadcast that are not successfully received (440).

This method can be implemented in a base station that has a structure as illustrated in FIG. 2. The base station includes a transceiver subsystem (i.e., transmit and receive subsystems 222 and 224) and a processor 228 which is coupled to the transceiver subsystem to control receipt of broadcast content from the broadcast content source and transmission of the formatted content to the broadcast recipients. The portion of the method that is implemented in processor 228 is implemented through the programming of the processor. Accordingly, it is contemplated that software, firmware or any other type of program instructions that are used for this purpose and which are configured to perform methods as disclosed herein also comprise embodiments of the present invention.

Figure 5:
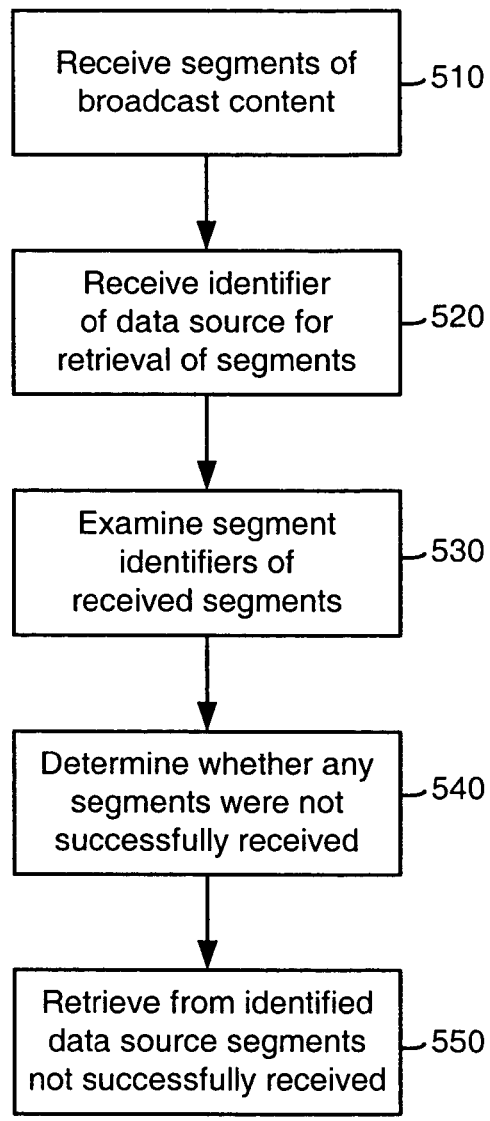
FIG. 5 is a flow diagram illustrating a method in accordance with another alternative embodiment of the invention.

Another alternative embodiment of the invention may comprise a method implemented on the receiving side of broadcast link (e.g., in a mobile station). This embodiment is illustrated by the flow diagram of FIG. 5. In this embodiment, the method comprises receiving segments of broadcast content, wherein each segment has an associated sequential segment identifier (510), receiving an identifier of a data source from which segments that are not successfully received can be retrieved (520), examining the segment identifiers associated with the received segments (530), determining whether any of the segments were not successfully received (540), and retrieving from the identified data source any segments that were not successfully received (550).

This method can also be implemented in a system having the structure illustrated in FIG. 2, although the structure is, in this instance, illustrative of a mobile station. The mobile station includes a transceiver subsystem and a processor which are used to implement the method. The transceiver subsystem receives the broadcast content and data source identifier, while the processor performs the examination of the content and determination of whether any of the content is missing. The processor also controls the transceiver subsystem to retrieve any missing segments. Again, any software, firmware or other type of program instructions that are used to control the processor to perform methods as disclosed herein comprise alternative embodiments of the present invention.

The embodiments described above focus on the use of a wireless communications system. It should be noted that alternative embodiments need not employ wireless systems, but may be implemented in any broadcast system, including wireline system configurations. For instance, the invention could be implemented in the context of a network-based broadcast. Thus, the base station may receive the content and broadcast the segments to users that are coupled to the base station by hard-wired connections. In such an embodiment, of course, terms such as "base station" and "mobile station" could appropriately be replaced by terms such as "broadcast station" and "receiving station". Still other alternative embodiments could employ combinations of wireless and wireline communication links. For example, it is possible that a mobile station (or receiving station) could receive broadcast data via a wireless link and perform point-to-point communications to retrieve missing segments from a data source using a wireline connection.

The various aspects and features of the present invention have been described above with regard to specific embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method implemented in an apparatus comprising:
the apparatus formatting broadcast content from a broadcast source into a plurality of segments comprising a first segment and a second segment;
the apparatus associating a sequential segment identifier with each of the segments;
the apparatus broadcasting the segments and associated sequential segment identifiers; and
the apparatus communicating, in association with the broadcast content, one or more data source identifiers of a plurality of data sources from which unsuccessfully received broadcasted segments can be retrieved, wherein the first segment is associated with a first data source and the second segment is associated with a second data source.

2. The method as recited in claim 1 wherein the broadcasting is via a wireless communication link.

3. The method as recited in claim 1 wherein the communicating the one or more data source identifiers of a plurality of data sources is via a wireless link.

4. The method as recited in claim 1 wherein the broadcasting and the communicating the one or more data source identifiers of a plurality of data sources is via a common wireless link.

5. The method as recited in claim 1 wherein the sequential segment identifiers comprise a series of sequential numbers.

6. The method as recited in claim 1 wherein the sequential segment identifiers comprise a series of transmission timestamps.

7. The method as recited in claim 1 further comprising:
operating at least one of the plurality of data sources identified by the one or more data source identifiers in association with operating a broadcast content source for broadcasting the broadcast content.

8. The method as recited in claim 1 further comprising:
operating at least one of the plurality of data sources identified by the one or more data source identifiers independent of operating a broadcast content source for broadcasting the broadcast content.

9. The method as recited in claim 1 wherein the one or more data source identifiers identifies an internet web site.

10. The method as recited in claim 1 wherein the broadcast content includes at least one of a program code, multi media content, audio content and video content.

11. The method of claim 1, wherein the segments and associated sequential segment identifiers are sent to a plurality of receivers from the broadcast source via a first communication path comprising a first plurality of links, and wherein the receivers retrieve unsuccessfully received broadcasted segments from at least one of the data sources via a second communication path comprising a link that is different than the plurality of links.

12. A method implemented in an apparatus comprising:
the apparatus receiving broadcast content from a broadcast source comprising a plurality of segments including a sequential segment identifier for identifying each of the segments, the plurality of segments comprising a first segment and a second segment; and
the apparatus receiving a one or more data source identifiers for identifying a plurality of data sources for retrieving unsuccessfully received segments, wherein the first segment is associated with a first data source and the second segment is associated with a second data source.

13. The method as recited in claim 12 further comprising:
the apparatus examining the sequential segment identifier associated with each received segment;
the apparatus determining whether any of the segments are unsuccessfully received; and
the apparatus retrieving unsuccessfully received segments from at least one of the plurality of data sources identified by the one or more data source identifiers.

14. The method as recited in claim 13 wherein the retrieving unsuccessfully received segments from the at least one of the plurality of data sources is via a wireless communication link.

15. The method as recited in claim 13 wherein the receiving of the one or more data source identifiers for identifying the plurality of data sources is via a wireless communication link and the retrieving unsuccessfully received segments from the at least one of the plurality of data sources is via another wireless communication link.

16. The method as recited in claim 13 wherein the receiving of the broadcast content and the receiving of one or more data source identifiers for identifying the plurality of data sources is via a common wireless communication link and the retrieving unsuccessfully received segments from the at least one of the plurality of data sources is via another wireless communication link.

17. The method as recited in claim 13 wherein the retrieving includes automatically transmitting a request to the at least one of the identified data sources for retrieving the unsuccessfully received segments.

18. The method as recited in claim 13 wherein the retrieving includes prompting a user of a unsuccessfully received segment, initiating transmission of a request for retrieving the unsuccessfully received segment, and transmitting the request to the at least one identified data sources.

19. The method as recited in claim 13 wherein the retrieving includes receiving the unsuccessfully received segments from the at least one identified data sources.

20. The method as recited in claim 12 wherein the receiving of the broadcast content is via a wireless communication link.

21. The method as recited in claim 12 wherein the receiving of the one or more data source identifiers for identifying the plurality of data sources is via a wireless communication link.

22. The method as recited in claim 12 wherein the receiving of the broadcast content and the receiving of the one or more data source identifiers for identifying the plurality of data sources is via a common wireless communication link.

23. The method as recited in claim 12 wherein the sequential segment identifiers comprise a series of sequential numbers.

24. The method as recited in claim 12 wherein the sequential segment identifiers comprise a series of timestamps.

25. The method of claim 12 wherein at least one of the one or more data source identifiers identifies an internet web site.

26. The method of claim 12 wherein the broadcast content includes at least one of a program code, multi media content, audio content and video content.

27. The method of claim 12, wherein the broadcast content is received from the broadcast source via a first communication path comprising a first plurality of links, and wherein unsuccessfully received segments are retrieved from at least one of the data sources via a second communication path comprising a link that is different than the plurality of links.

28. An apparatus comprising:
means for formatting broadcast content from a broadcast source into a plurality of segments comprising a first segment and a second segment;
means for associating a sequential segment identifier with each of the segments;

means for broadcasting the segments and associated sequential segment identifiers; and means for communicating in association with the broadcast content, one or more data source identifiers of a plurality of data sources from which unsuccessfully received broadcasted segments can be retrieved, wherein the first segment is associated with a first data source and the second segment is associated with a second data source.

29. The apparatus as recited in claim 28 wherein the means for broadcasting to the receivers includes means for broadcasting via a wireless communication link.

30. The apparatus as recited in claim 28 wherein the means for communicating the one or more data source identifiers of the plurality of data sources includes means for communicating via a wireless link.

31. The apparatus as recited in claim 28 further comprising:

means for associated operations of the identified data sources and a broadcast content source for the means for broadcasting the broadcast content.

32. The apparatus as recited in claim 28 further comprising:

means for independent operations of the identified data sources and a broadcast content source for broadcasting the broadcast content.

33. The apparatus of claim 28, wherein the segments and associated sequential segment identifiers are sent to a plurality of receivers via a first communication path comprising a first plurality of links, and wherein the receivers retrieve unsuccessfully received broadcasted segments from at least one of the data sources via a second communication path comprising a link that is different than the plurality of links.

34. An apparatus comprising:

means for receiving broadcast content from a broadcast source comprising a plurality of segments including a sequential segment identifier for identifying each of the segments, the plurality of segments comprising a first segment and a second segment; and means for receiving one or more data source identifiers for identifying a plurality of data sources for retrieving unsuccessfully received segments, wherein the first segment is associated with a first data source and the second segment is associated with a second data source.

35. The apparatus as recited in claim 34 further comprising:

means for examining the sequential segment identifier associated with each received segment;
means for determining whether any of the segments are unsuccessfully received; and
means for retrieving unsuccessfully received segments from at least one of the plurality of data sources identified by the one or more data source identifiers.

36. The apparatus as recited in claim 35 wherein the means for retrieving unsuccessfully received segments from the at least one of the plurality of data sources includes means for retrieving via a wireless communication link.

37. The apparatus as recited in claim 35 wherein the means for receiving the one or more data source identifiers for identifying the plurality of data sources includes means for receiving via a wireless communication link and the means for retrieving unsuccessfully received segments from the at least one of the plurality of data sources includes means for receiving via another wireless communication link.

38. The apparatus as recited in claim 35 wherein the means for receiving the broadcast content and the means for receiving of the one or more data source identifiers for identifying the plurality of data sources includes means for receiving via a common wireless communication link and the means for retrieving unsuccessfully received segments from the at least one of the plurality of data sources includes means for retrieving via another wireless communication link.

39. The apparatus of claim 35 wherein the means for retrieving includes means for retrieving from an internet web site.

40. The apparatus as recited in claim 35 wherein the means for retrieving includes means for automatically transmitting a request to the identified at least one of the plurality of data sources for retrieving the unsuccessfully received segments.

41. The apparatus as recited in claim 35 wherein the means for retrieving includes means for prompting a user of a unsuccessfully received segment, initiating transmission of a request for retrieving the unsuccessfully received segment, and transmitting the request to the identified at least one of the plurality of data sources.

42. The apparatus as recited in claim 35 wherein the means for retrieving includes means for receiving the unsuccessfully received segments from the identified at least one of the plurality of data sources.

43. The apparatus as recited in claim 34 wherein the means for receiving the broadcast content includes means for receiving via a wireless communication link.

44. The apparatus as recited in claim 34 wherein the means for receiving the one or more data source identifiers for identifying the plurality of data sources includes means for receiving via a wireless communication link.

45. The apparatus as recited in claim 34 wherein the means for receiving the broadcast content and the means for receiving the one or more data source identifiers for identifying the plurality of data sources include means for receiving via a common wireless communication link.

46. The apparatus of claim 34, wherein the broadcast content is received from the broadcast source via a first communication path comprising a first plurality of links, and wherein unsuccessfully received segments are retrieved from at least one of the data sources via a second communication path comprising a link that is different than the plurality of links.

47. A method implemented in an apparatus comprising:

the apparatus broadcasting broadcast content comprising a first segment and a second segment from a broadcast source; and the apparatus communicating, in association with the broadcast content, one or more data source identifiers of a plurality of data sources from which unsuccessfully received broadcasted segments can be retrieved, wherein the first segment is associated with a first data source and the second segment is associated with a second data source.

48. The method as recited in claim 47 wherein the broadcasting is via a wireless communication link.

49. The method as recited in claim 47 wherein the communicating the one or more data source identifiers of a plurality of data sources is via a wireless link.

50. The method as recited in claim 47 wherein the broadcasting and the communicating the one or more data source identifiers of a plurality of data sources is via a common wireless link.

51. The method of claim 47, wherein the broadcast content is sent from the broadcast source to a plurality of receivers via a first communication path comprising a first plurality of links, and wherein the receivers retrieve unsuccessfully received broadcasted segments from at least one of the data sources via a second communication path comprising a link that is different than the plurality of links.

52. A non-transitory computer readable storage medium encoded thereon instructions that when executed cause an apparatus to perform a method, said method comprising:
  broadcasting broadcast content comprising a first segment and a second segment from a broadcast source; and
  communicating, in association with the broadcast content, one or more data source identifiers of a plurality of data sources from which unsuccessfully received broadcasted segments can be retrieved, wherein the first segment is associated with a first data source and the second segment is associated with a second data source.

53. The non-transitory computer readable storage medium of claim 52, wherein the broadcast content is sent from the broadcast source to a plurality of receivers via a first communication path comprising a first plurality of links, and wherein the receivers retrieve unsuccessfully received broadcasted segments from at least one of the data sources via a second communication path comprising a link that is different than the plurality of links.

54. A non-transitory computer readable storage medium encoded thereon instructions that when executed cause an apparatus to perform a method, said method comprising:
  receiving broadcast content from a broadcast source comprising a plurality of segments including a sequential segment identifier for identifying each of the segments, the plurality of segments comprising a first segment and a second segment; and
  receiving, in at least one electronic device, a one or more data source identifiers for identifying a plurality of data sources for retrieving unsuccessfully received segments, wherein the first segment is associated with a first data source and the second segment is associated with a second data source.

55. The non-transitory computer readable storage medium of claim 54, wherein the broadcast content is received from the broadcast source via a first communication path comprising a first plurality of links, and wherein unsuccessfully received segments are retrieved from at least one of the data sources via a second communication path comprising a link that is different than the plurality of links.

56. An apparatus comprising:
  a transceiver configured to:
    broadcast broadcast content comprising a first segment and a second segment from a broadcast source; and
    communicate, in association with the broadcast content, one or more data source identifiers of a plurality of data sources from which unsuccessfully received broadcasted segments can be retrieved, wherein the first segment is associated with a first data source and the second segment is associated with a second data source; and
  a processor coupled to the transceiver configured to process the broadcast content.

57. The apparatus of claim 56, wherein the broadcast content is sent from the broadcast source to a plurality of receivers via a first communication path comprising a first plurality of links, and wherein the receivers retrieve unsuccessfully received broadcasted segments from at least one of the data sources via a second communication path comprising a link that is different than the plurality of links.

58. An apparatus comprising:
  a transceiver configured to:
    receive broadcast content from a broadcast source comprising a plurality of segments including a sequential segment identifier for identifying each of the segments, the plurality of segments comprising a first segment and a second segment; and
    receive a one or more data source identifiers for identifying a plurality of data sources for retrieving unsuccessfully received segments, wherein the first segment is associated with a first data source and the second segment is associated with a second data source; and
  a processor coupled to the transceiver configured to process the broadcast content.

59. The apparatus as recited in claim 58, wherein the processor is further configured to:
  examine the sequential segment identifier associated with each received segment; and
  determine whether any of the segments are unsuccessfully received; and
  the transceiver is further configured to retrieve unsuccessfully received segments from at least one of the data sources identified by the one or more data source identifiers.

60. The apparatus as recited in claim 59, wherein the transceiver is configured to receive unsuccessfully received segments from the at least one of the data sources via a wireless communication link.

61. The apparatus as recited in claim 59, wherein the transceiver is configured to receive the one or more data source identifiers for identifying the plurality of data sources via a wireless communication link, and wherein the transceiver is configured to receive unsuccessfully received segments from the at least one of the data sources via another wireless communication link.

62. The apparatus as recited in claim 59, wherein the transceiver is configured to receive the broadcast content and to receive the one or more data source identifiers for identifying the plurality of data sources via a common wireless communication link, and wherein the transceiver is configured to receive unsuccessfully received segments from the at least one of the data sources via another wireless communication link.

63. The apparatus as recited in claim 59, wherein the transceiver is further configured to automatically transmit a request to the at least one of the identified data sources for retrieving the unsuccessfully received segments.

64. The apparatus as recited in claim 59, wherein the processor is further configured to prompt a user of a unsuccessfully received segment and initiate transmission of a request for retrieving the unsuccessfully received segment, and the transceiver is further configured to transmit the request to the at least one of the identified data sources.

65. The apparatus as recited in claim 59, wherein the transceiver is further configured to receive the unsuccessfully received segments from the at least one of the identified data sources.

66. The apparatus as recited in claim 58, wherein the transceiver is configured to receive the broadcast content via a wireless communication link.

67. The apparatus as recited in claim 58, wherein the transceiver is configured to receive the one or more data source identifiers for identifying the plurality of data sources via a wireless communication link.

68. The apparatus as recited in claim 58, wherein the transceiver is configured to receive the broadcast content and the receiving of the one or more data source identifiers for identifying the plurality of data sources via a common wireless communication link.

69. The apparatus as recited in claim 58, wherein the sequential segment identifiers comprise a series of sequential numbers.

70. The apparatus as recited in claim 58, wherein the sequential segment identifiers comprise a series of timestamps.

71. The apparatus of claim 58, wherein at least one of the data source identifiers identifies an internet web site.

72. The apparatus of claim 58, wherein the broadcast content includes at least one of a program code, multi media content, audio content and video content.

73. The apparatus of claim 58, wherein the broadcast content is received from the broadcast source via a first communication path comprising a first plurality of links, and wherein unsuccessfully received segments are retrieved from at least one of the data sources via a second communication path comprising a link that is different than the plurality of links.

74. An apparatus comprising:
   at least one processor configured to:
      format broadcast content from a broadcast source into a plurality of segments comprising a first segment and a second segment; and
      associate a sequential segment identifier with each of the segments; and
   a transceiver configured to
      broadcast the segments and associated sequential segment identifiers; and
      communicate, in association with the broadcast content, one or more data source identifiers of a plurality of data sources from which unsuccessfully received broadcasted segments can be retrieved, wherein the first segment is associated with a first data source and the second segment is associated with a second data source.

75. The apparatus of claim 74, wherein the segments and associated sequential segment identifiers are sent to a plurality of receivers from the broadcast source via a first communication path comprising a first plurality of links, and wherein the receivers retrieve unsuccessfully received broadcasted segments from at least one of the data sources via a second communication path comprising a link that is different than the plurality of links.

76. A mobile station comprising:
   at least one processor configured to:
      receive broadcast content from a broadcast source comprising a plurality of segments including a sequential segment identifier for identifying each of the segments, wherein the plurality of segments comprises a first segment and a second segment; and
      receive a one or more data source identifiers for identifying a plurality of data sources for retrieving unsuccessfully received segments, wherein the first segment is associated with a first data source and the second segment is associated with a second data source; and
   an antenna coupled to the at least one processor configured to receive data.

77. The apparatus of claim 76, wherein the broadcast content is received from the broadcast source via a first communication path comprising a first plurality of links, and wherein unsuccessfully received segments are retrieved from at least one of the data sources via a second communication path comprising a link that is different than the plurality of links.

78. A base station comprising:
   at least one processor configured to:
      broadcast broadcast content from a broadcast source, wherein the broadcast content comprises a first segment and a second segment; and
      communicate, in association with the broadcast content, one or more data source identifiers of a plurality of data sources from which unsuccessfully received broadcasted segments can be retrieved, wherein the first segment is associated with a first data source and the second segment is associated with a second data source; and
   an antenna coupled to the at least one processor configured to transmit data.

79. The base station of claim 78, wherein the broadcast content is sent from the broadcast source to a plurality of receivers via a first communication path comprising a first plurality of links, and wherein the receivers retrieve unsuccessfully received broadcasted segments from at least one of the data sources via a second communication path comprising a link that is different than the plurality of links.

80. A base station comprising
   at least one processor configured to:
      format broadcast content from a broadcast source into a plurality of segments comprising a first segment and a second segment;
      associate a sequential segment identifier with each of the segments;
      broadcast the segments and associated sequential segment identifiers; and
      communicate, in association with the broadcast content, one or more data source identifiers of a plurality of data sources from which unsuccessfully received broadcasted segments can be retrieved, wherein the first segment is associated with a first data source and the second segment is associated with a second data source; and
   an antenna coupled to the at least one processor configured to transmit data.

81. The base station of claim 80, wherein the segments and associated sequential segment identifiers are sent to a plurality of receivers from the broadcast source via a first communication path comprising a first plurality of links, and wherein the receivers retrieve unsuccessfully received broadcasted segments from at least one of the data sources via a second communication path comprising a link that is different than the plurality of links.

82. A non-transitory computer readable storage medium encoded thereon instructions that when executed cause an apparatus to perform a method, said method comprising:
   formatting broadcast content from a broadcast source into a plurality of segments comprising a first segment and a second segment;
   associating a sequential segment identifier with each of the segments;
   broadcasting the segments and associated sequential segment identifiers; and
   communicating, in association with the broadcast content, one or more data source identifiers of a plurality of data sources from which unsuccessfully received broadcasted segments can be retrieved, wherein the first segment is associated with a first data source and the second segment is associated with a second data source.

83. The non-transitory computer readable storage medium of claim 82, wherein the segments and associated sequential segment identifiers are sent to a plurality of receivers from the broadcast source via a first communication path comprising a first plurality of links, and wherein the receivers retrieve unsuccessfully received broadcasted segments from at least one of the data sources via a second communication path comprising a link that is different than the plurality of links.

84. An apparatus comprising:
- means for broadcasting broadcast content from a broadcast source, wherein the broadcast content comprises a first segment and a second segment; and
- means for communicating, in association with the broadcast content, one or more data source identifiers of a plurality of data sources from which unsuccessfully received broadcasted segments can be retrieved, wherein the first segment is associated with a first data source and the second segment is associated with a second data source.

85. The apparatus of claim 84, wherein the broadcast content is sent from the broadcast source to a plurality of receivers via a first communication path comprising a first plurality of links, and wherein the receivers retrieve unsuccessfully received broadcasted segments from at least one of the data sources via a second communication path comprising a link that is different than the plurality of links.

* * * * *